(12) United States Patent
Stass et al.

(10) Patent No.: US 8,881,031 B2
(45) Date of Patent: Nov. 4, 2014

(54) SYSTEMS AND METHODS FOR FACILITATING MEDIA CONNECTIONS

(75) Inventors: Adam Stass, Houston, TX (US); Dustin Yu, Houston, TX (US)

(73) Assignee: AYU Technology Solutions LLC, Houston, TX (US)

( * ) Notice: Subject to any disclaimer, the term of this patent is extended or adjusted under 35 U.S.C. 154(b) by 316 days.

(21) Appl. No.: 13/302,960

(22) Filed: Nov. 22, 2011

(65) Prior Publication Data

US 2012/0151384 A1    Jun. 14, 2012

Related U.S. Application Data

(60) Provisional application No. 61/416,228, filed on Nov. 22, 2010.

(51) Int. Cl.
```
G06F 3/048      (2013.01)
G06F 3/01       (2006.01)
G06Q 30/06      (2012.01)
G06Q 10/10      (2012.01)
```
(52) U.S. Cl.
CPC ............... *G06Q 30/06* (2013.01); *G06Q 10/10* (2013.01)

USPC .......... 715/758; 715/753; 715/864; 715/781; 345/169

(58) Field of Classification Search
USPC ........ 715/733, 753, 758, 764, 765, 781, 810, 715/864; 345/169; 709/204; 705/319
See application file for complete search history.

(56) References Cited

U.S. PATENT DOCUMENTS

| | | | |
|---|---|---|---|
| 6,434,599 B1 * | 8/2002 | Porter | 709/204 |
| 2008/0209351 A1 * | 8/2008 | Macadaan et al. | 715/762 |
| 2011/0022450 A1 * | 1/2011 | Meredith | 705/14.4 |

\* cited by examiner

*Primary Examiner* — Xiomar L Bautista
(74) *Attorney, Agent, or Firm* — Klarquist Sparkman, LLP

(57) ABSTRACT

A method of connecting consumers with third parties includes providing one or more widgets adjacent a plurality of directory listings of third parties on webpage, with each widget being associated with one of the third parties. An indication can be received that a consumer has executed one of the widgets. The consumer and third party can be connected in a live chat session in response to the execution of the widget. The live chat session can be configured to allow direct communication between the consumer and the third party.

6 Claims, 6 Drawing Sheets

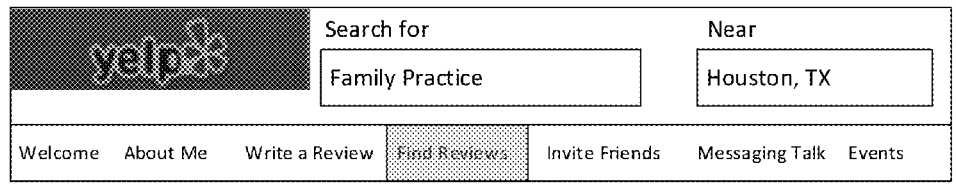
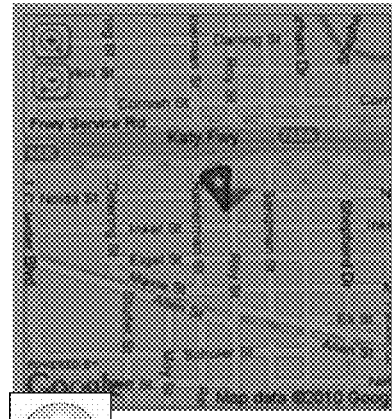
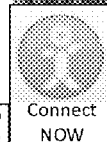

Hayley Nguyen, MD

Category: Family Practice
5151 Katy Fwy
Ste 100
Houston, TX 77007

(555) 555-4101

| Send to Friend | Bookmark | Send to Phone | Connect NOW |

Hayley Nguyen, MD www.drnguyen.net

Sorry, but we are not available at the moment. Please leave us a message and we will get back to you as soon as possible. Thank you.

Your Name:
Your Email:
Your Question:

[click here to start typing]

Connect

This is the offline stage of the chat window. When the listing is unavailable for chat and the visitor clicks on the Connect NOW button, the offline message/lead form will appear.

This is where the visitor can leave a message to the listing in which the message will be emailed to the listing's email address instantly so the listing can contact the visitor when they check their email.

(you can also customize this form to ask for additional information as well)

SYSTEMS AND METHODS FOR FACILITATING MEDIA CONNECTIONS

CROSS-REFERENCE TO RELATED APPLICATION

This application claims the benefit of U.S. Provisional Application No. 61/416,228, which was filed on Nov. 22, 2010, and is incorporated herein by reference in its entirety.

FIELD

The present disclosure is directed to methods and systems for providing and facilitating media connections and, in particular, for facilitating live chat communications.

BACKGROUND

Live chat services are available in various forums where a known host (e.g., a company or business) provides a user (e.g., a customer or client) with the ability to engage directly with the host. In this manner, conventional live chat services allow users to send and receive text communications with the host to request information or services from the host. However, such conventional live chat systems only allow users to engage the host of the live chat services—they do not allow users to directly connect and communicate with parties other than the host.

In addition, in conventional live chat services, the host generally has an active call center staff that is available to receive and respond to requests for live chats during specified hours. If the request for chat services is made outside of the specified hours, a live chat is not initiated and the user must wait until the live chat services is next available.

SUMMARY

The following embodiments remedy the deficiencies of conventional live chat services as described above.

In one embodiment, a method of connecting consumers with third parties is provided. The method includes providing one or more widgets adjacent a plurality of directory listings of third parties on webpage, with each widget being associated with one of the third parties. An indication can be received that a consumer has executed one of the widgets. The consumer and third party can be connected in a live chat session in response to the execution of the widget. The live chat session can be configured to allow direct communication between the consumer and the third party.

In some embodiments, the act of connecting the consumer and third party in the live chat session comprises opening a new window in a browser of the consumer. In other embodiments, when the third party is not available, the consumer is provided a message indicating the unavailability of the third party. The consumer can be provided with the opportunity to leave a message for the third party when the third party is not available. In addition, or alternatively, the consumer can be provided with an option to communicate directly with an intermediary live chat operator. In some embodiments, the third party can communicate with the consumer in the live chat session using a text messaging device, such as a smartphone.

The foregoing and other objects, features, and advantages of the invention will become more apparent from the following detailed description, which proceeds with reference to the accompanying figures.

BRIEF DESCRIPTION OF THE DRAWINGS

FIG. 3 is a marked-up exemplary screenshot of a directory listing of a third party, indicating a Live Chat introduction window that is opened when an instant chat widget is executed (e.g., the Connect NOW! widget) and the third party is not available.

FIG. 4 is a marked-up exemplary screenshot of another directory listing of a third party, indicating a Live Chat introduction window that is opened when an instant chat widget is executed (e.g., the Connect NOW! widget).

DETAILED DESCRIPTION

Figure 1:
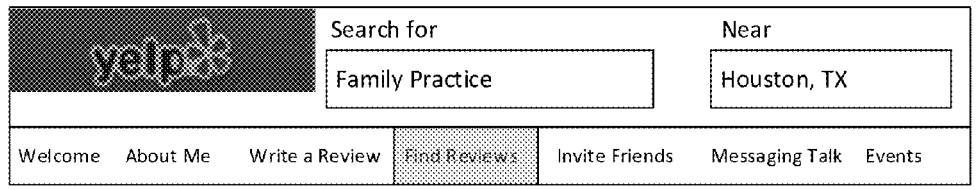
FIG. 1 is a marked-up exemplary screenshot of a directory listing of a third party, indicating a Live Chat introduction window that is opened when an instant chat widget is executed (e.g., the Connect NOW! widget).

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "determine" and "provide" to describe the disclosed methods. These terms are high-level abstractions of the actual operations that are performed. The actual operations that correspond to these terms may vary depending on the particular implementation and are readily discernible by one of ordinary skill in the art.

Implementations of Methods and Systems Using Software

The systems and methods described herein may be implemented or performed by software stored on one or more tangible computer-readable media (e.g., one or more optical media discs, volatile memory or storage components (such as DRAM or SRAM), or nonvolatile memory or storage components (such as hard drives)) and executed on one or more computing systems. The computing systems can include one or more central processing units (CPUs) and a memory, such as random access memory (RAM) for temporary storage of information and/or a read only memory (ROM) for permanent storage of information, and a mass storage device, such as a hard drive, diskette, or optical media storage device.

Such software can be executed on a single computer or on a networked computer (e.g., via the Internet, a wide-area network, a local-area network, a client-server network, or other such network). The systems and methods disclosed herein can also be performed using cloud computing, a form of Internet-based computing, whereby shared resources, software and information are provided to computers and other devices on-demand. The software embodiments disclosed herein can be described in the general context of computer-executable instructions, such as those included in program modules, which can be executed in a computing environment on a target real or virtual processor.

The computing system may run on a variety of computing devices, such as, for example, a server, a Windows server, a Structure Query Language server, a Unix server, a personal computer, a mainframe computer, a laptop computer, a mobile device (e.g., a smartphone, cellphone, a personal digital assistant), a kiosk, an audio player, and so forth. As described in more detail below, in certain embodiments, mobile devices can provide access to live chat connections, thereby providing a user with a synchronous or nearly synchronous chat environment.

Furthermore, any of the software embodiments (comprising, for example, computer-executable instructions for causing a computer to perform any of the disclosed methods) can be transmitted, received, or accessed through a suitable communication means. Similarly, any data structure, data file, intermediate result, or final result created or modified using any of the disclosed methods can be transmitted, received, or accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means now known or unknown. Moreover, any data structure, data file, intermediate result, or final result produced by any of the disclosed methods can be displayed to a user using a suitable display device (e.g., a computer monitor or display). Such displaying can be performed as part of a computer-implemented method of performing any of the disclosed methods.

As used herein, the term "widget" refers to a software widget configured for use with a website or other information-displaying medium. When used within a website, widgets are relatively small applications that can be installed on a webpage and executed by clicking on an icon representative of the widget that is positioned within the webpage. The execution of the widget can cause a new window to open, such as a live chat window, to provide a means of communication between a consumer and a third party. The term widget also includes applications that, in some cases, can be referred to using any of the following terms: portlet, gadget, badge, module, webjit, capsule, snippet, mini and/or flake. In some embodiments, the widgets are created in DHTML, JavaScript, and/or Adobe Flash.

Integration of "Connect NOW!" System with Directory Listings

The systems and methods illustrating integration of the ConnectNow! with various other systems allows businesses to reach more customers at a faster and more efficient process. As a result, more effective communications can be achieved providing numerous advantages, including, in some embodiments, higher sales due to increased customer communication.

The systems and methods described herein can function to connect users with third parties by a simple and direct connection device. In one embodiment, a widget can be provided adjacent a listed profile within a directory. Such directory listings are currently available to provide consumers with directories of people, businesses, and services and include such listings as Yelp, YP, Local, CitySearch, etc. The selection of the widget by clicking on the icon associated with the widget can instantly connect the user with third party identified in the listing.

As shown in FIG. 1, for example, an exemplary directory listing on Yelp is displayed. An icon, such as the "Connect NOW" icon shown in FIG. 1, can be positioned on the webpage adjacent information about the person, business, and/or service being listed. In the example shown in FIG. 1, a medical doctor is identified and the "Connect NOW" icon is positioned immediately below the address and contact information of the medical doctor.

Figure 4:
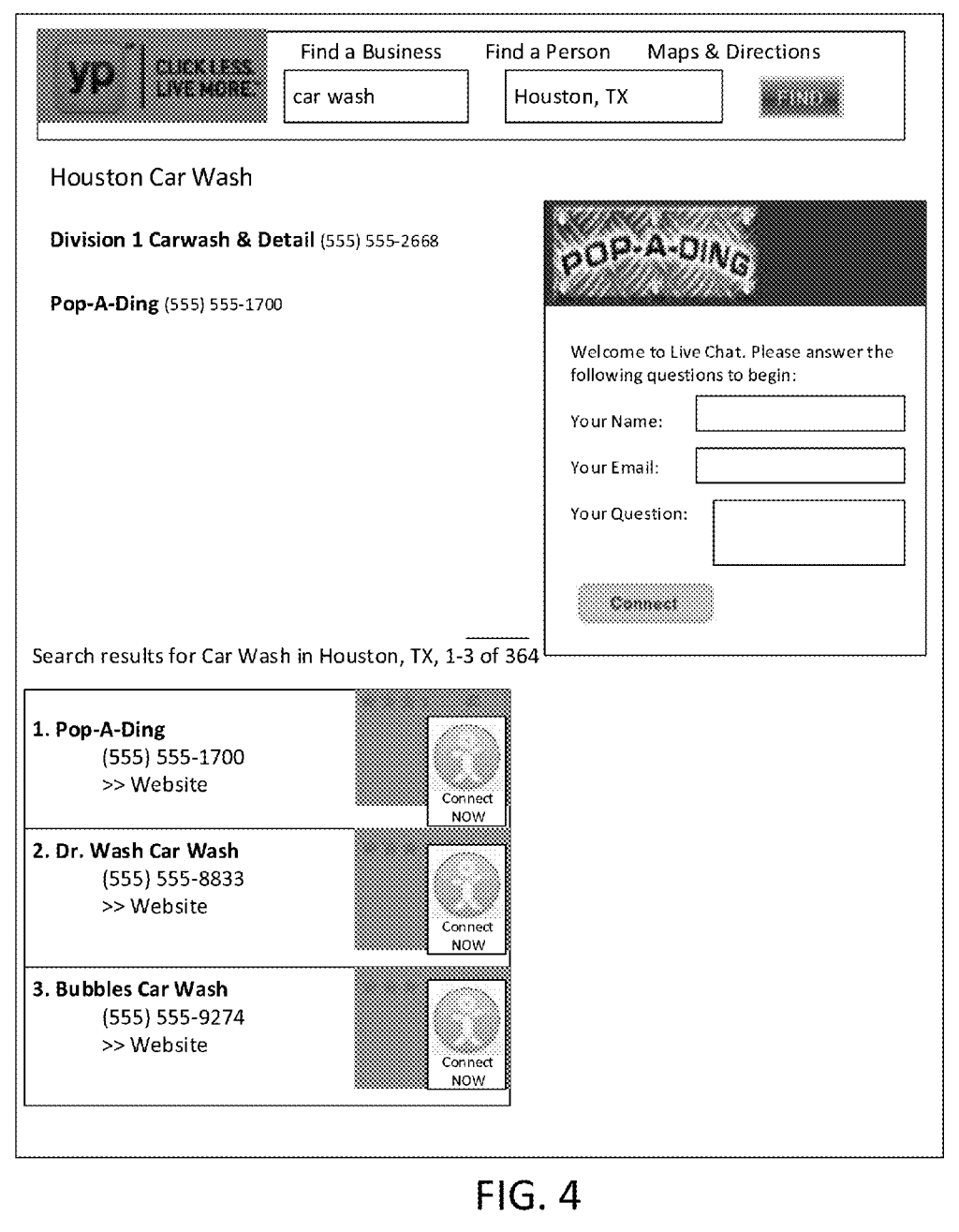
Figure 5:
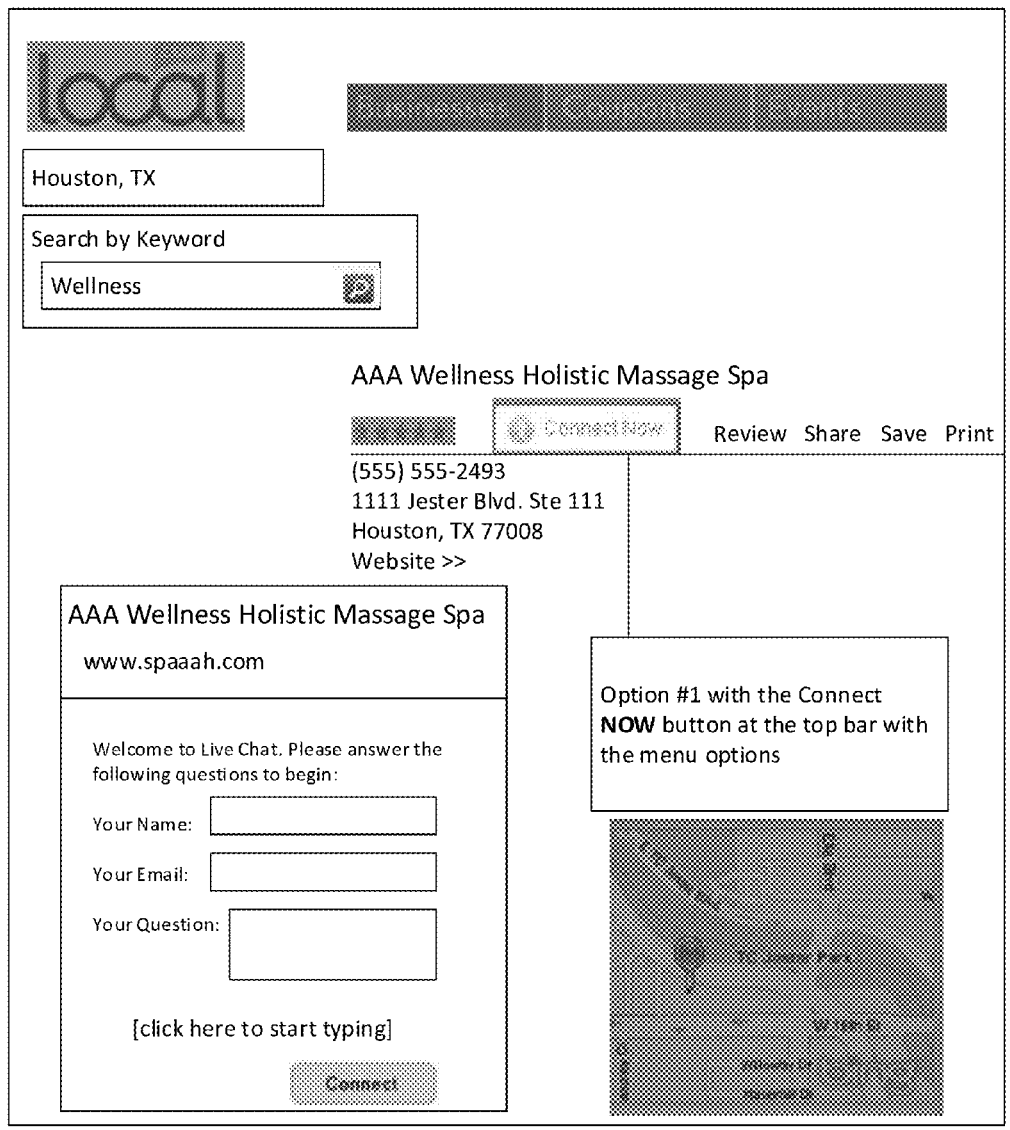
FIG. 5 is a marked-up exemplary screenshot of yet another directory listing of a third party, indicating a Live Chat introduction window that is opened when an instant chat widget is executed (e.g., the Connect NOW! widget).
Figure 6:
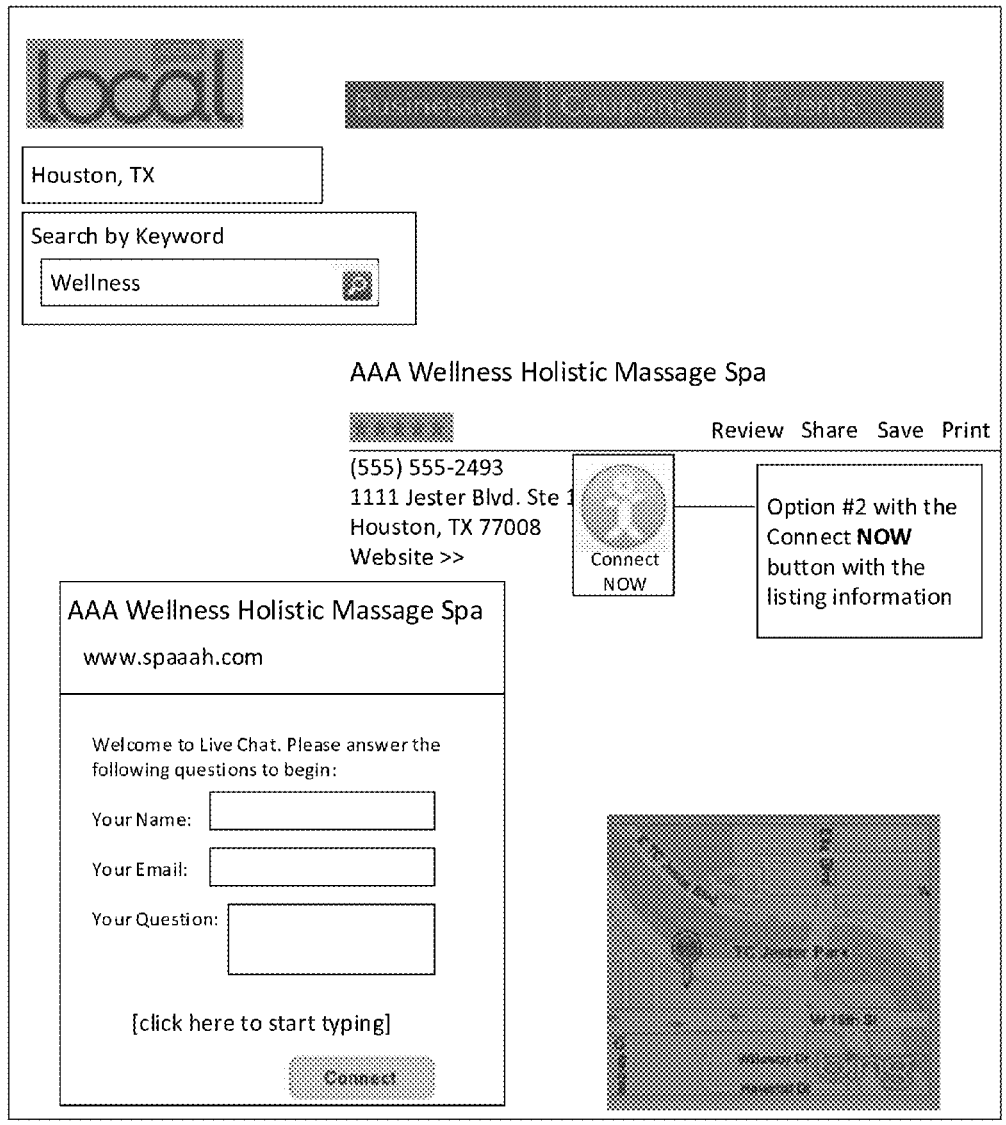
FIG. 6 is a marked-up exemplary screenshot of yet another directory listing of a third party, indicating a Live Chat introduction window that is opened when an instant chat widget is executed (e.g., the Connect NOW! widget).

The location of the icon on the screen can vary; however, it is preferably displayed near the address and/or other contact information of the third party. FIGS. 4, 5, and 6 illustrate additional examples of directory listings with a "Connect NOW" icon positioned adjacent address and contact information of other third parties (i.e., a car wash business in FIG. 4 and a wellness business in FIGS. 5 and 6).

To directly engage a person, business, or service (e.g., the medical doctor shown in FIG. 1), a user (e.g., a consumer) can simply execute the Connect NOW! widget that is tied to the business's directory listing by clicking on the icon that represents the widget. As shown in FIG. 1, once the Connect NOW! widget is executed, the consumer can be prompted to enter certain identifying and/or information data in a window or other text-entry area. For example, the consumer can be asked to enter his/her email address and present a question or other request for information to the person, business, or service (e.g., the medical doctor shown in FIG. 1).

Figure 2:
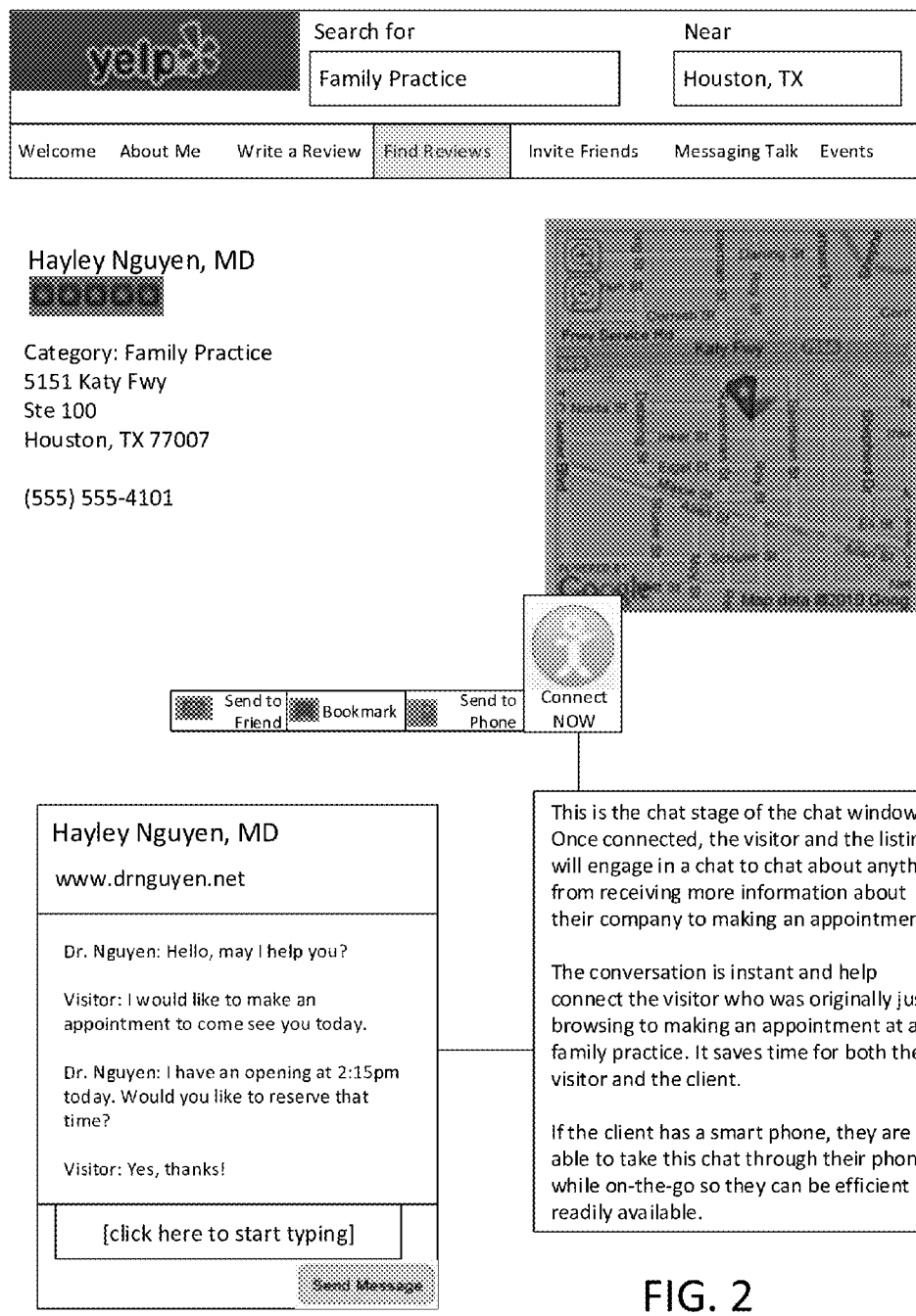
FIG. 2 is a marked-up exemplary screenshot of a Live Chat introduction window illustrating a chat between a consumer and a third party (e.g., a medical doctor).

Once the information is completed and entered, the consumer can be directly connected to the person, business, or service via a live chat connection. FIG. 2 illustrates a live chat stage of an instant connection between a consumer and a third-party person, business, or service. In the chat stage, the consumer and third-party person, business, or service can engage in a chat about anything from receiving more information about the offered services to making a specific appointment to engage the services of the third-party person, business, or service.

In some embodiments, both the consumer and third party accounts can be accessed via either web applications on the Internet or via a mobile device application. This allows both the consumer and third party to engage in live chat conversations and exchange messages, regardless of whether they are at work, home, or other locations in between. In addition, if one or both of the consumer and third party are not available to engage in a live chat, the messages can be saved in a central location and the consumer and/or third party can receive instant alerts via text message or push notification as to when the other party responds. As described above, accessing the live chat systems described herein using mobile devices, such as cellphones, smartphones and the like, can provide nearly instantaneous chat connections.

As shown in FIG. 3, if the third party is not immediately available to chat, a message can be left for the business and answered when the business is available to reply. The message will be delivered to the third party (e.g., the person, business, or service) and the third party can respond to the message at their earliest opportunity.

If the third party is not immediately available, in some embodiments an intermediary live chat service can be offered to the consumer. The intermediary live chat service can comprise, in some embodiments, a live answering service that is equipped with knowledge of the third party so that they can assist in answering the customer's question, or just otherwise capturing a new lead (e.g., a potential business lead or other benefit) for the third party.

As discussed above, a widget or other internet-connection member can be provided to provide live connection functionality to a website such as Yelp™. In other embodiments, however, a live connection business search portal can be provided in which all, or substantially all, businesses are provided with live connection comment (e.g., live chat, click to call, sms text notification, etc.) so that a person searching can connect in real time to the business.

Unified Inbox

Once a third party (e.g., a business) receives a request from a consumer, whether it is a live chat or message, they can immediately reply directly to the customer. In addition, all live chats and messages can be gathered and delivered to a central, unified system. In this manner, businesses no longer have to go through multiple systems—separate email accounts, cell phone text messages, etc., to respond to customers. This provides a much more responsive and efficient method of communicating and connecting consumers and third parties because consumers can get an instant, real-time synchronous replies, or, in some circumstances, delayed—but not by much—asynchronous replies. Accordingly, the instant connection provided by the Connect NOW! systems and methods described herein allow consumers and third parties to connect directly with each other, and respond in the shortest time possible.

Indicators of Live Chat Responsiveness

In some embodiments, third parties that utilize the Connect NOW! service will also receive an indicator of their promptness in responding to requests for information. This indication can also be me available to consumers looking to connect with third parties. For example, a scale can be provided to display and show to consumers expected response times of a particular third party. Thus, for example, the indicator can show 100% active—live chat ON, 50% active—the third party will reply within 4 hours, 25% active—the third party will reply within 24 hours, or 0% active—no reply guaranteed. Of course, other status indicators and systems of displaying responsiveness can be implemented. This status indication can be monitored and updated over time to reflect accurate responsiveness of third parties.

Accordingly, as described herein, the various systems and methods allows consumers to contact businesses to communicate in real-time via live chat, click-to-call, self-service, or offline form modes of communication. When the communication occurs via the live chat mode, customers or other persons can initiate the live chat with the business resulting in both parties being engaged in a real time text chat conversation. When the communication occurs via the click to call mode, a customer or other person can initiate a click to call request with a business by entering their phone number into the system, causing the system to connect them to the business through a phone call.

When the communication occurs via the self service mode, a business can provided pre-determined answers to frequently asked questions which are later accessible to the customer if they choose not to communicate with the business in other methods. Thus, at least in some embodiments, the self service mode of communication can automate the answering of customer inquiries before needing to directly involve the business.

When the communication occurs via the offline form mode, customers can leave one or more messages via an offline form. In some embodiments, the customer can include their inquiry along with their contact information, and the business receive a notice shortly thereafter, allowing them to reply to the customer at their earliest convenience. Although this approach can be the slowest form of communication between the customer and business, it also potentially requires the least amount of involvement from the business since the business can choose the time to respond to the inquiry.

The system can include a widget or other internet-based container. In HTML terms, the container can be a pop-up browser window or DIV layer that resides on a web page. These systems can be integrated with information-containing systems (such as websites and webpages) in various manners. For example, widgets, as described herein, can be embedded within a web directory listing, social networking profile page, web kiosk, Windows/Mac application, etc. In some embodiments, a business can receive and send messages with any internet connected device such as a desktop computer or mobile phone or tablet.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of connecting consumers with third parties, the method comprising:
   providing one or more widgets adjacent a plurality of directory listings of third parties on webpage, each widget being associated with one of the third parties;
   receiving an indication that a consumer has executed one of the widgets; and
   connecting the consumer and third party in a live chat session, the live chat session being configured to allow direct communication between the consumer and the third party.

2. The method of claim 1, wherein the act of connecting the consumer and third party in the live chat session comprises opening a new window in a browser of the consumer.

3. The method of claim 1, wherein when the third party is not available, the consumer is provided a message indicating the unavailability of the third party.

4. The method of claim 3, wherein the consumer is further provided with the opportunity to leave a message for the third party when the third party is not available.

5. The method of claim 3, wherein the third party is not available, the consumer is provided with an option to communicate directly with an intermediary live chat operator.

6. The method of claim 1, wherein the third party can communicate with the consumer in the live chat session using a text messaging device, such as a smartphone.

* * * * *